United States Patent [19]

Cowen et al.

[11] Patent Number: 5,647,046
[45] Date of Patent: Jul. 8, 1997

[54] WEDGE DEADEND TO SUPPORT AERIAL CABLES

[75] Inventors: Calvin Cowen, West Union; Wayne L. Quesnel, Moore, both of S.C.; William N. Parrott, Birmingham, Ala.; Michael G. Jones, Spartanburg, S.C.

[73] Assignee: Alcoa Fujikura Limited, Brentwood, Tenn.

[21] Appl. No.: 650,360

[22] Filed: May 20, 1996

Related U.S. Application Data

[60] Provisional application No. 60/007,368, Nov. 20, 1995.
[51] Int. Cl.⁶ ................................. G02B 6/00
[52] U.S. Cl. ................................. 385/136
[58] Field of Search ............... 362/293; 359/618, 359/730, 889; 439/717, 176; 385/134–136, 147

[56] References Cited

U.S. PATENT DOCUMENTS

| | | | |
|---|---|---|---|
| 3,832,539 | 8/1974 | Oram | 362/293 |
| 3,911,266 | 10/1975 | Oram | 362/296 |
| 4,674,832 | 6/1987 | Hirai et al. | 350/96.21 |
| 4,699,683 | 10/1987 | McCowin | 156/353 |
| 4,719,672 | 1/1988 | Apperson et al. | 24/135 |
| 4,761,053 | 8/1988 | Cogelia et al. | 350/96.23 |
| 4,772,090 | 9/1988 | Atkins | 350/96.23 |
| 4,779,951 | 10/1988 | Bouvard et al. | 385/135 |
| 4,795,856 | 1/1989 | Farmer | 174/40 |
| 4,832,442 | 5/1989 | Pappas | 350/96.23 |
| 5,092,663 | 3/1992 | Hivner | 385/100 |
| 5,575,690 | 11/1996 | Eaton | 439/717 |

*Primary Examiner*—Akm E. Ullah
*Attorney, Agent, or Firm*—Tracey D. Beiriger

[57] ABSTRACT

An apparatus, called a wedge deadend, used to secure aerial fiber optic transmission lines or cables. The deadend and secured cable can effectively be attached to support structures such as poles or towers. The wedge deadend has a single assembled frame with an attaching cable for mounting to the support structure and two wedges that slide into the frame. The frame consists of two parallel plates. Each plate has two slots that are tapered and angled toward one another. The wedges are similarly tapered enabling them to be interlocked with the side plates. Both wedges also have a groove that is sized and textured to grip a specified cable. The wedges can be designed to compress the encased cable evenly along the entire contact surface of the wedge, or with varying force along such surface.

25 Claims, 5 Drawing Sheets

FIG. I
(PRIOR ART)
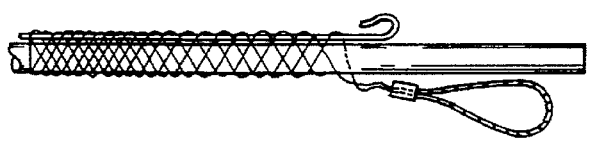
FIG. 2
(PRIOR ART)
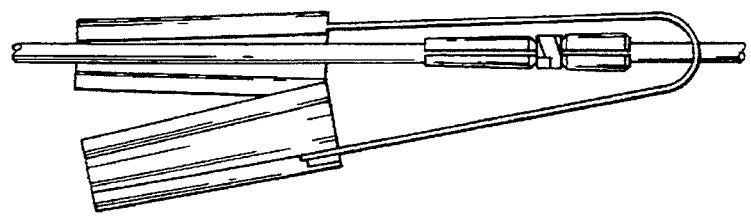
FIG. 3
(PRIOR ART)
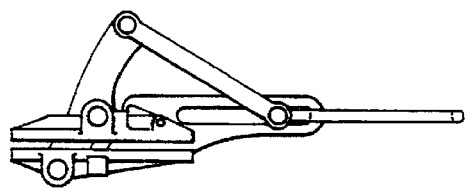
FIG. 4
(PRIOR ART)
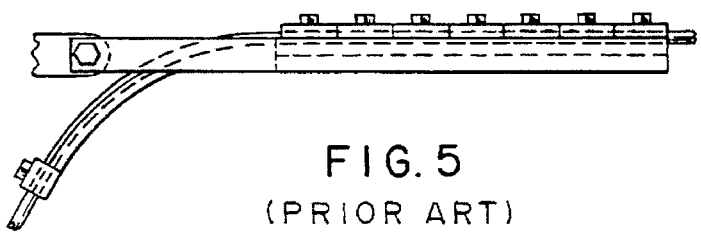
FIG. 5
(PRIOR ART)

WEDGE DEADEND TO SUPPORT AERIAL CABLES

RELATED APPLICATIONS

This application claims the benefit of U.S. Provisional Application No. 60/007,368, filed Nov. 20, 1995.

BACKGROUND OF THE INVENTION

1. Field of the Invention

This invention pertains to a lightweight, compact apparatus, referred to as a deadend used to attach aerial fiber optic transmission lines or cables to support structures such as poles or towers.

2. Technology Review

Existing deadends are generally bulky and difficult to install. Several different types of deadend technology are presently used for joining aerial fiber optic cables to support structures. One type of deadend widely used is the formed wire deadend shown in FIG. 1. These deadends consist of bundles of wires joined side by side and formed into a helical ribbon. Three to four of these bundles are wrapped around the cable side by side to virtually surround the cable. A second layer of formed wires are wrapped over this inner layer. This second layer has a formed bail or attaching cable which is placed over a thimble clevis attached to the support structure.

The formed wire deadend is difficult to install. For example, wrapping the formed wires around the cable requires a great deal of hand strength. Also, the installer's fingers often get pinched while wrapping the formed wires around the cable. Further, these deadends can be as long as twelve feet and are heavy and bulky, and therefore, cannot be installed from the support structure. Also accurate alignment, which often takes a great amount of time, must be maintained between the bundles of formed wires.

A second type of deadend, shown in FIG. 2, is the split mesh Kellems® grip. These deadends operate like a Chinese finger grip to hold the cable. Woven wire mesh is wrapped around the cable and a wire or rod is used to weave the mesh edges together where they overlap to form a tubular woven wire mesh about the cable. As the cable load is transferred to the grip, the grip tightens along the cable.

Wrapping the woven wire mesh around the cable and weaving the edges together with the wire rod is somewhat awkward. Further, such weaving is time-consuming causing the split mesh Kellems® grip deadends to be somewhat costly to install.

A third type of deadend currently used is the conical type deadend. These deadends, as shown in FIG. 3, are typically used on smaller optical cables subject to low cable tension. Conical type deadends have a two piece frame with a conical slot that is assembled over the cable, and an attaching cable which is used to attach the frame to the support structure. Inserts which have an outside conical taper and an inside slot sized to grip the cable are placed over the cable and slide into the matching conical slot of the frame. As the pulling force on the cable increases, the inserts slide forward in the frame and tighten around the cable to prevent it from slipping. Problems of the conical type deadends include the difficulty of manufacturing the internal and external slots when the deadend is to be used with high load cables. Further, this type of deadend is difficult to install because the installation process includes assembly of the frame around the cable which requires additional labor and special tools.

Another type of deadend, as shown in FIG. 4, is the leverage or pivoting clamp deadend. Leverage deadends have one or more pivot points. Gripping plates on one side of the pivot and pulling points on the other function similar to pliers to grip the cable tighter as the cable tension increases. This type of deadend is typically used as a temporary cable grip during cable installation due to its small size and quick installation. However, this type of deadend is not recommended for permanent use because it is quite heavy and is expensive to manufacture. Further, the long-term performance of the leverage deadend is questionable, especially when subject to oscillating loads due to cable low frequency galloping. Galloping is a large amplitude cable oscillation caused by wind and resulting in loading and unloading of the deadend.

Bolted deadends, as shown in FIG. 5, are another type of deadend currently used. These deadends consist of a base plate with a groove sized to fit a specified cable design. A series of plates with matching grooves are bolted onto the top of the base plate with the cable sandwiched between. Bolted deadends are typically used for large cables and cables carrying very high cable loads. Again, this type of deadend is very heavy. Further, because of the numerous bolts that must be tightened, the bolted deadend is time-consuming to install.

Therefore there is a need for a deadend which is compact, lightweight and inexpensive to manufacture. Also needed is a deadend which is easy to install that meets the system performance requirements of strength and long term reliability without deteriorating cable performance and can be installed from the support structure.

It is an object of the present invention to provide a deadend for joining aerial fiber optic transmission lines or cables to support structures that is inexpensive and easy to install.

It is another object of the present invention to provide a deadend for joining aerial fiber optic transmission lines or cables to support structures that is compact and lightweight.

It is a further object of the present invention to provide a deadend for joining aerial fiber optic transmission lines or cables to support structures that is inexpensive to manufacture.

It is yet another object of the present invention to provide a deadend for joining aerial fiber optic transmission lines or cables to support structures that does not require special tools for installation.

It is still another object of the present invention to provide a deadend for joining aerial fiber optic transmission lines or cables to support structures that meets the system performance requirements of strength and long term reliability without deteriorating cable performance.

Additional objects and advantages of the invention will be set forth in the description that follows.

SUMMARY OF THE INVENTION

This invention is directed to a deadend device, called a wedge deadend, employed to attach aerial fiber optic transmission lines or cables to support structures such as poles or towers. The wedge deadend has a single frame with an attaching cable or ball for mounting to the support structure and two wedges that slide into the frame. The frame consists of two parallel plates. Each plate has two slots that are tapered and angled toward one another. The wedges are similarly tapered enabling them to be interlocked with the side plates. Both wedges also have a groove that is sized and textured to grip a specified cable. The wedges can be designed to compress the encased cable evenly along the entire contact surface of the wedge, or with varying force along such surface.

The wedge deadend is installed by hand by manually removing the bottom wedge completely from the frame and partially sliding the top wedge out of the frame. The frame and top wedge are then placed on top of the cable. The bottom wedge is then inserted under the cable and into the frame. After aligning the wedges, the frame is pushed back onto the wedges allowing the wedge to tighten about the cable. Finally, the cable or the ball, a hoop-like handle, is attached to the support structure.

BRIEF DESCRIPTION OF THE DRAWINGS

FIG. 1 illustrates a prior art formed wire deadend where no apparatus as in the present invention is utilized.

FIG. 2 illustrates a prior art split mesh Kellems® grip where no apparatus as in the present invention is utilized.

FIG. 3 illustrates a prior art conical type deadend where no apparatus as in the present invention is utilized.

FIG. 4 illustrates a prior art leverage or pivoting clamp deadend where no apparatus as in the present invention is utilized.

FIG. 5 illustrates a prior art bolted deadend where no apparatus as in the present invention is utilized.

DETAILED DESCRIPTION OF PREFERRED EMBODIMENTS

Figure 6:
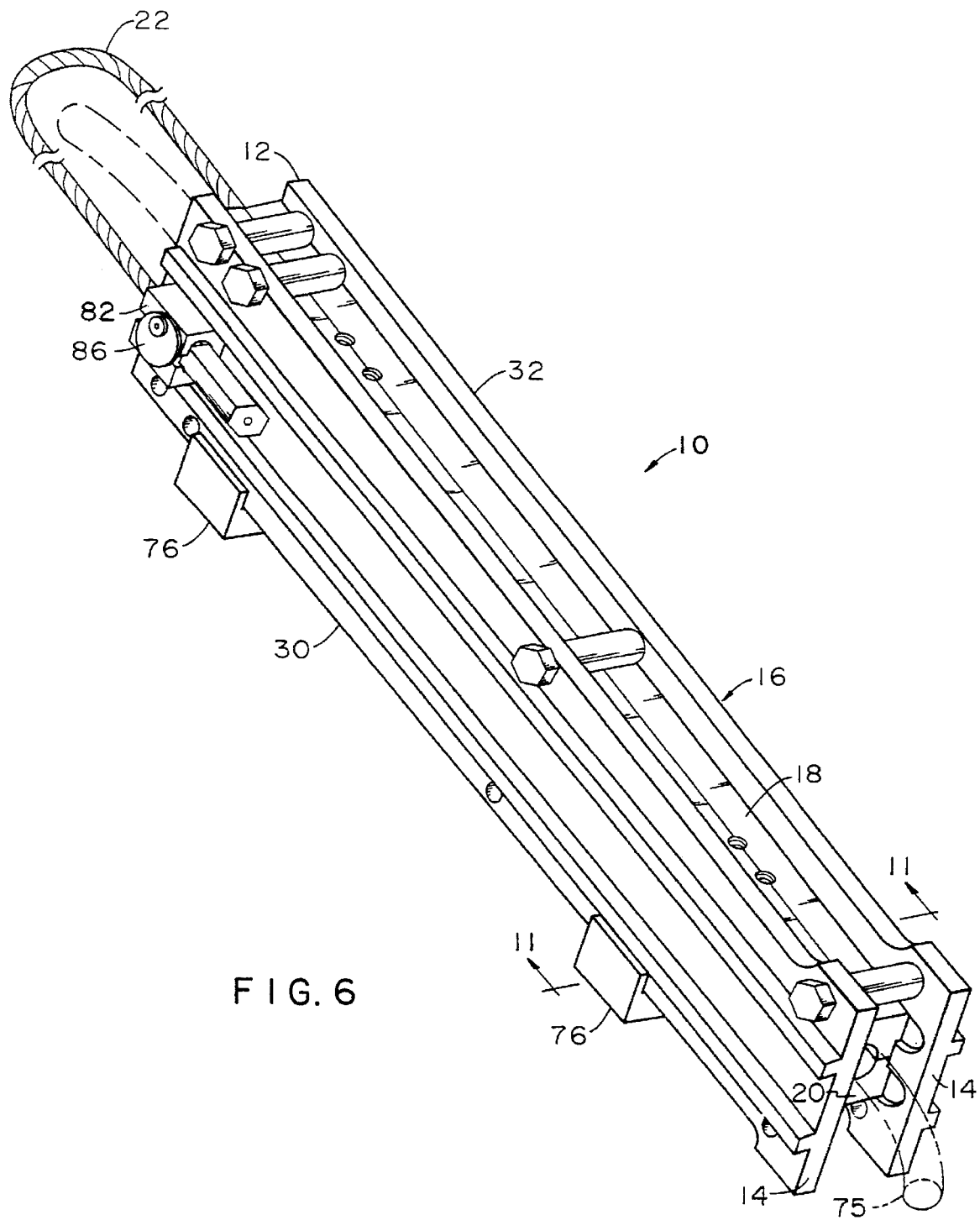
FIG. 6 is a perspective view of the wedge deadend of this invention.

FIG. 6 depicts the wedge deadend of the subject invention, indicated generally by the reference numeral 10. Deadend 10 consists of first end 12, second end 14, assembled frame 16, upper wedge 18, lower wedge 20 and a cable or ball 22 attached near first end 12 of deadend 10 to mount or otherwise fasten deadend 10 to a support structure (not shown). Frame 16 includes a first side plate 30 and a parallel second side plate 32.

Figure 7:
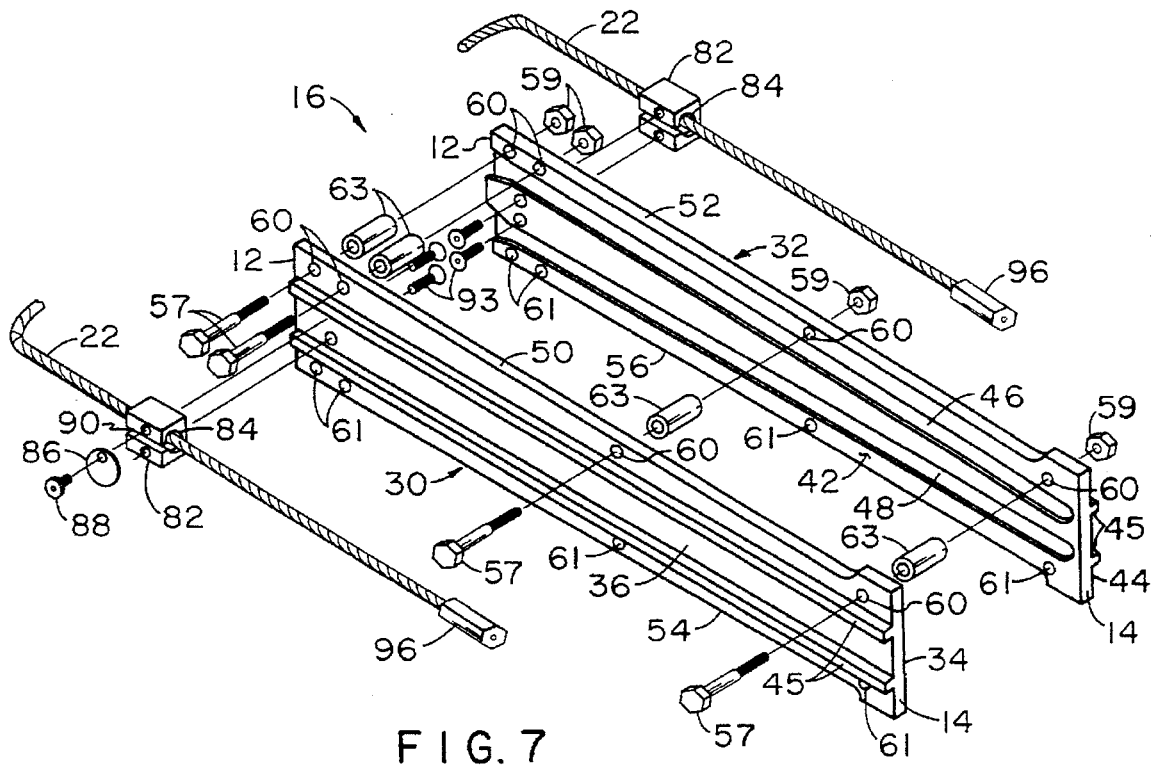
FIG. 7 is an exploded view showing the frame assembly and a partial view of the attaching cable of the deadend.
Figure 11:
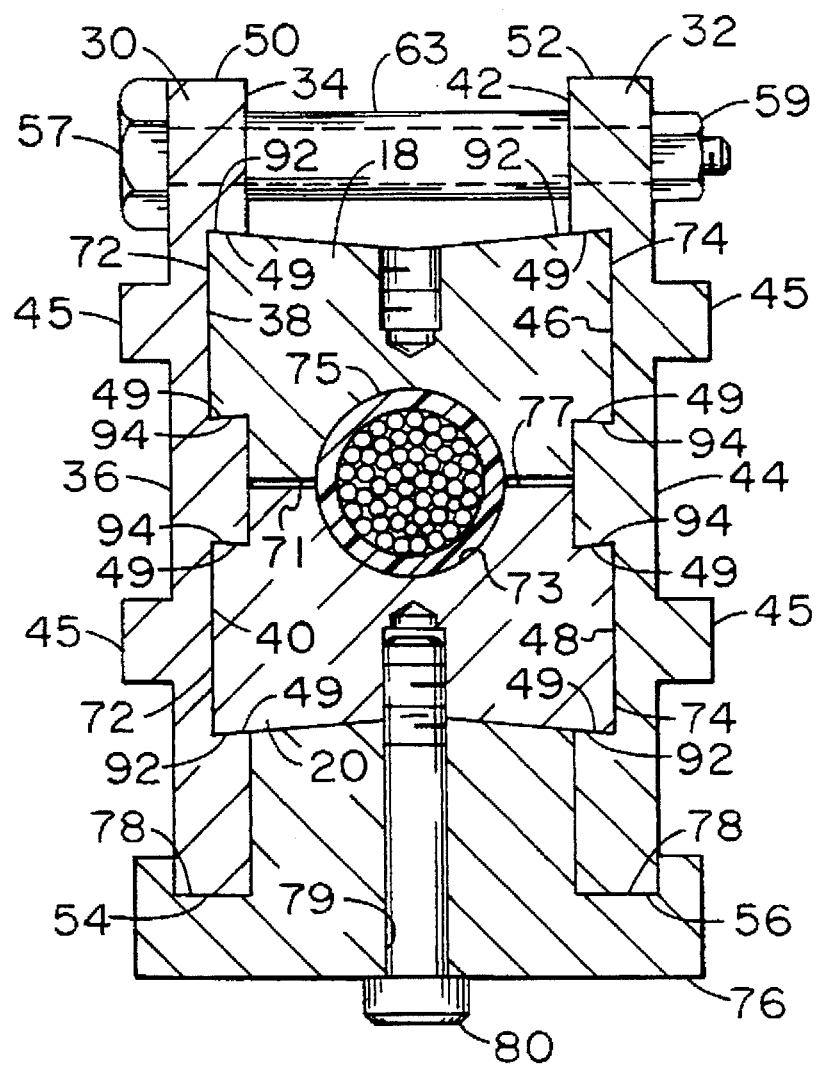
FIG. 11 shows an enlarged cross-sectional view of the wedge deadend of this invention taken on line 11—11 of FIG. 6.

As shown in FIG. 7, first side plate 30 has an inner surface 34, an outer surface 36 and upper and lower slots 38 and 40 respectively (FIG. 11) on inner surface 34. Second side plate 32 has an inner surface 42, an outer surface 44 and upper and lower slots 46 and 48 respectively on inner surface 42. Ribs 45 are located on outer surfaces 36 and 44 of plates 30 and 32. Plates 30 and 32 are gripped using ribs 45 during machining. These ribs 45 also add strength to side plates 30 and 32 as well as add support to block 82 when deadend 10 is used. Upper slot 38 and lower slot 40 extend the length of first side plate 30 and are longitudinally angled toward each other as they extend from first end 12 to the second end 14 but terminate short of the second end. Likewise, upper slot 46 and lower slot 48 extend the length of second side plate 32 and are angled longitudinally toward each other as they extend from first end 12 to the second end 14 but stop short of the second end (FIG. 7). Further, slots 38, 40, 46 and 48 have a dovetail type taper 49, as shown in FIG. 11. The width and depth of slots 38, 40, 46 and 48 depend on cable load requirements.

Figure 10:
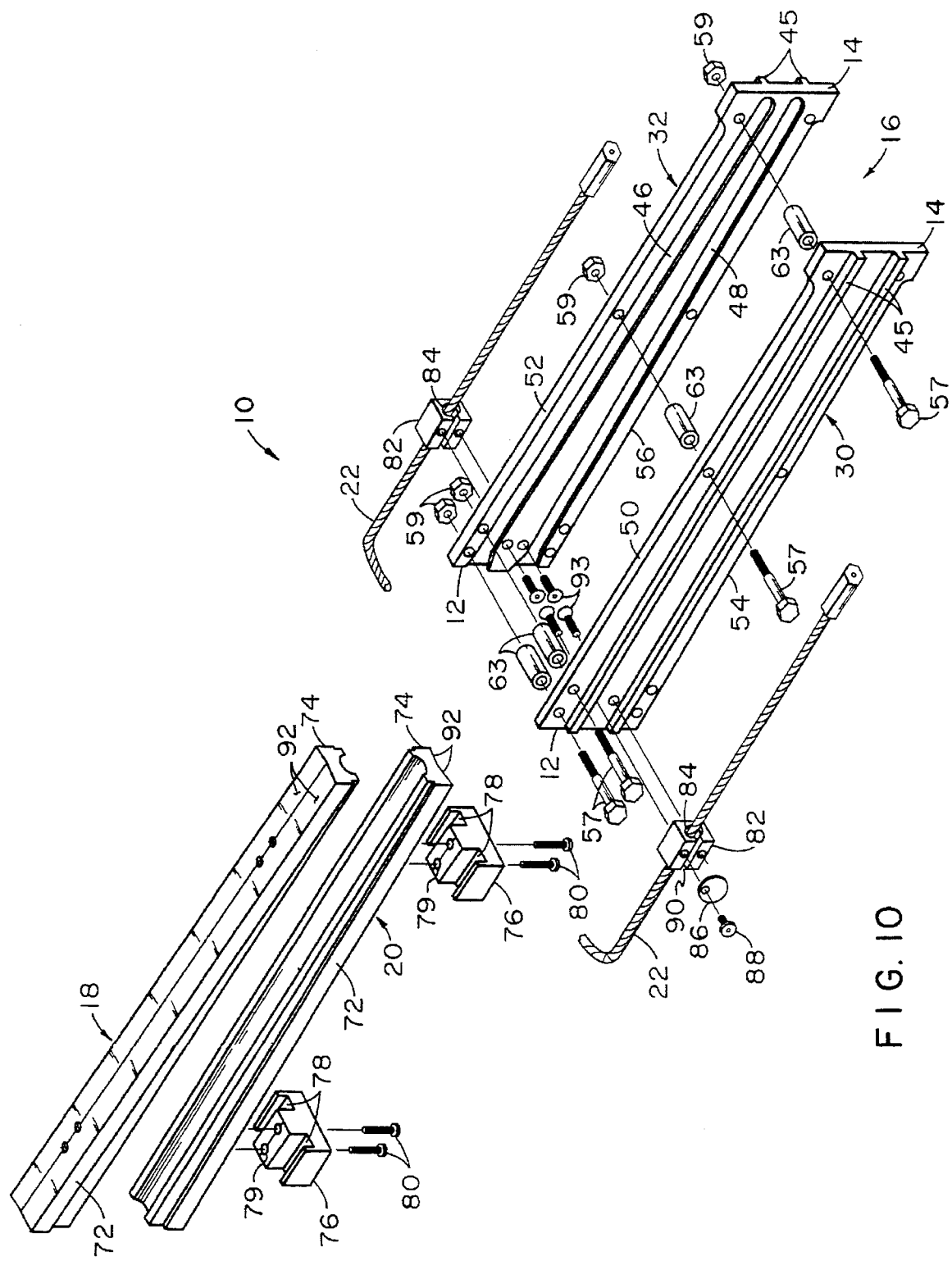
FIG. 10 is an exploded view showing the frame assembly and wedges of the deadend.

Plates 30 and 32 have top edges 50 and 52 and bottom edges 54 and 56 respectively as shown in FIGS. 7 and 10. Edges 50, 52, 54 and 56 are parallel to slots 38, 46, 40 and 48, respectively. Across top edges 50 and 52, a plurality of corresponding openings or holes 60 are provided to receive bolts 57 to secure together first side plate 30 and second side plate 32 using nuts 59. Tubular spacers 63, supported on bolts 57 maintain the desired spacing between plates 30 and 32. A plurality of openings or holes 61 are located across bottom edges 54 and 56. These openings are provided so that first plate 30 and second plate 32 are symmetrical and can be interchanged if desired. The bottom edges 54 and 56 of plates 30 and 32 are left open permitting frame 16 to be placed over the cable during installation.

Figure 8:
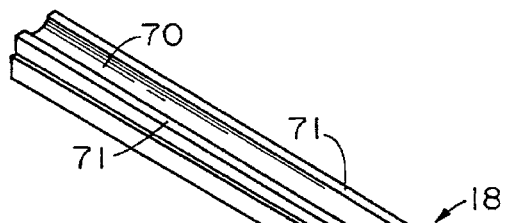
FIG. 8 is a perspective view of the upper wedge of the deadend.
Figure 9:
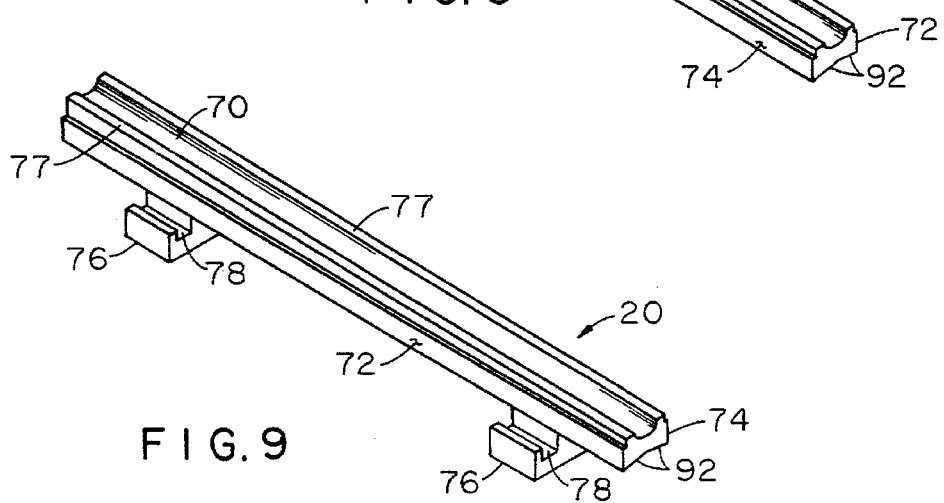
FIG. 9 is a perspective view of the lower wedge of the deadend.

Both upper wedge 18 and lower wedge 20, as respectively shown in FIGS. 8 and 9, have a groove 70 that extends the entire length of top surfaces 71 and 77 of the wedges. The wedges are longitudinally tapered at the same angle as slots 38, 40, 46 and 48 of the side plates 30 and 32. Further, each wedge has a first edge 72 and a second edge 74, both of which have angled surfaces 92 and 94 (FIG. 11), that are tapered so as to correspond to the dovetail tapers 49 of slots 38, 40, 46 and 48. Lower wedge 20, as discussed below, also cooperates with side plate retainers 76 as shown in FIGS. 9, 10 and 11.

Upper wedge 18 and lower wedge 20 are positioned in frame 16, as shown in FIG. 11, such that a gap is provided between top surfaces 71 and 77. Top surfaces 71 and 77 face each other such that grooves 70 cooperate to form a "circular" housing 73 for receiving and encasing a cable 75 when deadend 10 is in use. Grooves 70 can be sized, configured and textured or lined to accommodate various specified cable designs. For example, the surface of grooves 70 can be plain or textured aluminum, or can be lined with an abrasive material such as silicon carbide grit or a compressive gripping material such as rubber. Grooves 70, as shown, are identical but need not be.

As shown in FIGS. 10 and 11, the wedges 18 and 20 are placed into frame 16, by inserting first edges 72 and second edges 74 into slots 38 and 40 and slots 46 and 48 of the side plates 30 and 32 respectively. The wedges first and second edges 72 and 74 interlock with the side plates because of the corresponding tapers 49 of the side plates and angled surfaces 92 and 94 of edges 72 and 74 (FIG. 11). As wedges 18 and 20 slide forward in frame 16, the wedges move toward each other and grooves 70 tighten around the cable. As mentioned previously, slots 38, 40, 46 and 48 stop just short of second end 14 of deadend 10. This prevents wedges 18 and 20 from sliding out of frame 16 when one of the wedges is not in place.

Lower wedge 20 cooperates with a plurality of side plate retainers 76 attached to its bottom surface with screws 80 via holes 79. These side plate retainers 76 have slots 78 that support the open bottom edges 54 and 56 of the first and second side plate respectively as the lower wedge 20 is inserted into frame 16 and slides along slots 40 and 48. The side plate retainers allow assembled frame 16 to be open during assembly on the cable and closed or supported after loading the wedges. The wedges can be designed to compress the cable evenly along the entire cable contact area or with varying force along the length of the wedges. Further, because edges 50, 52, 54 and 56 are parallel to slots 38, 46, 40 and 48, respectively, upper wedge 18 and lower wedge 20 can properly mate in frame 16.

Installation of the subject deadend is fast and easy. There are no special tools required. The deadend installs within approximately thirty inches of the support structure and does not require great hand strength or dexterity. The actual size of wedge deadend 10, the distance between first plate 30 and second plate 32 and the size of wedges 18 and 20 depends on the specific application for which it will be used. However, in one embodiment the deadend frame is typically seventeen inches long. For installation, lower wedge 20 is manually removed completely from frame 16, and upper wedge 18 is manually slid about half way out of the frame. Frame 16 and upper wedge 18 are placed on top of the cable. Lower wedge 20 is then inserted under the cable and into frame 16. Upper wedge 18 and lower wedge 20 are aligned with each other at the correct installation point along the cable. Frame 16 is pushed back onto wedges 18 and 20 which tighten around the cable. The quick and easy installation of the wedge deadend reduces installation time and costs.

Finally, cable or bail 22 is attached to the support structure. The cable or bail can be attached via mechanical fasteners to both the apparatus and the support structure. A bail retainer block 82 attached to side plates 30 and 32 with flat head screws 93, a bail lock disk 86 and screws 88 can be used to secure bail 22 to deadend 10. A bail retainer block 82 is located on each end of the bail 22 to attach the bail to side plates 30 and 32. One of these bail retainers 82 is mounted on one of the side plates so as to capture the bail. This prevents the bail from being separated from the frame and lost or dropped during installation of the deadend. The other bail retainer 82 is mounted so that the bail can be removed and then reinserted during installation. The bail lock disk 86 is installed via screw 88 over an open slot 90 in the bail retainer to keep this end of bail 22 in place during shipping and installation. Disk 86 can easily be loosened and turned to open the bail block slot 90 for temporary removal of this end of the bail during installation and then repositioned and tightened to cover slot 90 after installation. Bail 22 includes cable stops 96 that are attached onto both ends of a wire cable. These cable stops fit into a matching counter bore 84 in the bail retainer block 82 to hold them in place. Locking disk 86 also operates as a safety feature in that it prevents the end of bail 22 from springing out of the counter bore 84 in slot 90 during assembly, shipping and installation.

As cable load is applied to the wedge deadend, wedges 18 and 20 slide forward in frame 16 and tighten around the cable. These wedges grip the cable in proportion to the load on the cable. That is, the greater the cable load, the higher the load applied to the cable to secure it. Wedges 18 and 20 do not slide back when the load is released, thus, oscillating loads will not loosen the wedges because they are literally wedged into frame 16. The shallow taper of the wedges allows them to move forward in the frame significantly as the cable is loaded. By making this angle shallow, the compressive force that the wedges place on the cable for a given cable load and, hence the tensile force placed on the frame, is increased. The normal force of the wedges on the frame slots creates the friction force that locks the wedges in place. At the same time, the shallow angle decreases the tendency of the wedges to slide back out of the frame. Note that lubrication can be applied to the sliding surfaces to facilitate the wedges moving forward in the frame when the cable is loaded. The wedge deadend is designed so as to hold the cable with enough force to prevent cable slippage, but not enough force so as to damage the cable jacket or to diminish optical performance of the cable. Further, the design of the deadend permits the frame to easily be opened and closed without the use of tools.

The design of the frame and wedges make the deadend cost effective to manufacture. The flat plate concept reduces machining costs and raw material usage. Preferably, all machined parts of the deadend are made of aluminum while all hardware is stainless steel. Although, the hardware can be made from aluminum, the additional strength of steel hardware is generally desirable. Also, aluminum hardware tends to be less common, and therefore more expensive. Because the side plates of the frame and the wedges support the compressive and tensile loads on the cable, the fixture material is concentrated in these parts such that there is no superfluous material that would add to the cost of the device. This effective use of material allows this new design to be strong, yet lightweight, weighing in the preferred embodiment less than six pounds. Further, the flat plate design is easy to manufacture and assemble. Thus, the resulting deadend is compact, lightweight, and easy and inexpensive to manufacture and to install. Most importantly, the wedge deadend meets system performance requirements of strength and long term reliability without hindering cable performance.

Having described the presently preferred embodiments, it is to be understood that the invention may be otherwise embodied within the scope of the appended claims.

What is claimed is:

1. An apparatus for securing fiber optic transmission lines or cables comprising:

a frame having a pair of parallel plates with each plate having an inwardly facing surface and an outwardly facing surface, said inwardly facing surfaces having longitudinal upper and lower non-parallel tapered slots extending from a first end of the frame toward a second end of the frame; and opposed, upper and lower wedges having longitudinal tapered edges, the slots of said frame sized to receive the tapered edges of said wedges with the upper wedge interlocking with said upper slots and said lower wedge interlocking with the lower slots;

said wedges each having an inner face with a longitudinal groove such that when the wedges are located in said frame, a longitudinal opening is created by said grooves for seating a cable.

2. The apparatus of claim 1 further comprising side plate retainers secured to the bottom edges of said lower wedge and extending beyond said edges, said retainers having slots for supporting said plates when said lower wedge is inserted into the lower slots of said plates.

3. The apparatus of claim 1 wherein said plates have upper and lower edges and a plurality of openings along said edges for receiving fastening means to secure said plates together, said plates only being secured by fasteners located in said openings along said upper edge.

4. The apparatus of claim 3 wherein said plates are interchangeable such that when said plates are interchanged, said upper openings become said lower openings and said lower openings become said upper openings.

5. The apparatus of claim 3 wherein said securing means is a plurality of bolts.

6. The apparatus of claim 1 further including means for attaching said apparatus to a support structure.

7. The apparatus of claim 6 wherein said means is a cable secured to said apparatus.

8. The apparatus of claim 6 wherein said means is a handle affixed to said apparatus.

9. The apparatus of claim 6 wherein said means is secured to the outwardly facing surfaces of said plates.

10. The apparatus of claim 1 wherein said parallel plates have at least one projection for gripping during machining of said plates.

11. The apparatus of claim 10 wherein said projection comprises a pair of longitudinal ribs extending substantially the length of said plates, said ribs adding strength to the plates.

12. The apparatus of claim 1 wherein said longitudinal opening for said cable is circular.

13. The apparatus of claim 1 wherein said plates and said wedges are principally made of aluminum.

14. The apparatus of claim 1 wherein the longitudinal opening for said cable is lined with a gripping material.

15. The apparatus of claim 1 wherein the longitudinal opening for said cable is lined with a compressive material such as rubber.

16. The apparatus of claim 1 wherein the longitudinal opening for said cable is lined with a material selected from the group consisting of aluminum oxide, silicon carbide grit or a compressive rubber.

17. The apparatus of claim 1 wherein the surface of said longitudinal opening for said cable is textured to provide enhanced friction between the surface of the cable and the surface of the opening.

18. The apparatus of claim 1 wherein the surface of said longitudinal opening is lined with a material that provides additional friction between the surfaces of the wedge opening and cable.

19. The apparatus of claim 1 wherein said opening is sized to compress said cable substantially uniformly along the entire length of said wedges.

20. The apparatus of claim 1 wherein said opening compresses said cable with varying force along the length of said wedges.

21. An apparatus for securing fiber optic transmission lines or cables comprising:

a frame having a pair of parallel plates with each plate having an inwardly facing surface and an outwardly facing surface, said inwardly facing surfaces having longitudinal upper and lower non-parallel tapered slots extending from a first end of the frame toward a second end of the frame, said plates having upper and lower edges and a plurality of openings along said edges for receiving fastening means to secure said plates together, said plates only being secured by fasteners located in said openings along said upper edge; and opposed, upper and lower wedges having longitudinal tapered edges, the slots of said frame sized to receive the tapered edges of said wedges with the upper wedge interlocking with said upper slots and said lower wedge interlocking with the lower slots;

said wedges each having an inner face with a longitudinal groove such that when the wedges are located in said frame, a longitudinal opening is created by said grooves for seating a cable.

22. The apparatus of claim 21 wherein said plates are interchangeable such that when said plates are interchanged, said upper openings become said lower openings and said lower openings become said upper openings.

23. An apparatus for securing fiber optic transmission lines or cables comprising:

a frame having a pair of interchangeable parallel plates with each plate having an inwardly facing surface and an outwardly facing surface, said inwardly facing surfaces having longitudinal upper and lower nonparallel tapered slots extending from a first end of the frame toward a second end of the frame; and opposed, upper and lower wedges having longitudinal tapered edges, the slots of said frame sized to receive the tapered edges of said wedges with the upper wedge interlocking with said upper slots and said lower wedge interlocking with the lower slots;

said wedges each having an inner face with a longitudinal groove such that when the wedges are located in said frame, a longitudinal opening is created by said grooves for seating a cable.

24. The apparatus of claim 23 wherein said plates have upper and lower edges and a plurality of openings along said edges for receiving fastening means to secure said plates together, said plates only being secured by fasteners located in said openings along said upper edge.

25. An apparatus for securing fiber optic transmission lines or cables comprising:

upper and lower wedges having longitudinal tapered edges, said wedges each having an inner face with a longitudinal groove such that when said inner faces of said wedges are adjacent and opposed, a longitudinal opening is created by said grooves for seating a cable; and a frame having a pair of interchangeable parallel plates with each plate having an inwardly facing surface and an outwardly facing surface, said inwardly facing surfaces having longitudinal upper and lower non-parallel tapered slots extending from a first end of the frame toward a second end of the frame, said slots sized to receive the tapered edges of said wedges with the upper wedge interlocking with said upper slots and said lower wedge interlocking with the lower slots such that said upper and lower wedges are adjacent and opposed.

* * * * *